INVENTOR.
BRUCE L. BAXTER
ATTORNEY

Sept. 12, 1961  B. L. BAXTER  2,999,306
HOT PRESSURE WELDED HONEYCOMB PASSAGEWAY
PANELS AND LIKE STRUCTURES
Filed Nov. 19, 1956  2 Sheets-Sheet 2

*INVENTOR.*
BRUCE L. BAXTER
BY
*Arthur H Robert*
ATTORNEY

United States Patent Office 2,999,306
Patented Sept. 12, 1961

2,999,306
HOT PRESSURE WELDED HONEYCOMB PASSAGE-WAY PANELS AND LIKE STRUCTURES
Bruce L. Baxter, Louisville, Ky., assignor to Reynolds Metals Company, Richmond Va., a corporation of Delaware
Filed Nov. 19, 1956, Ser. No. 622,901
5 Claims. (Cl. 29—157.3)

This invention relates to the manufacture of metal honeycomb structures.

One previous method of making a honeycomb panel from a plurality of corrugated metal strips comprises: positioning one strip alongside another with their convex bends in abutting relationship; then individually welding the abutting bends together; and repeating these steps for each additional strip. This method, like other prior methods, is slow, laborious and correspondingly expensive.

The principal object of this invention is to provide a faster, less expensive and more desirable method of making a welded honeycomb panel from a plurality of metal sheets in which the welding of the entire panel can be simply and quickly performed in a single step.

Other important objects of this invention are: to provide a suitable method of making welded honeycomb panels using aluminum sheets; to provide a simple method of manufacturing honeycomb heat exchanger panels from metal sheets; and to provide a honeycomb heat exchanger panel having internal liquid passages extending transversely of the honeycomb passages.

The objects of my invention are achieved by: assembling a stack of superposed metal sheets with appropriate patterns of spaced parallel stop-weld strips sandwiched between them, the alternate patterns being aligned with each other and transversely offset from the intermediate patterns which are aligned with each other; welding the bare contacting surfaces of the stacked sheets together outside of the stop-weld areas by applying heat and pressure to the stack as a whole; and separating adjacent sheets along the non-welded areas to form a plurality of honeycomb passages.

If the panel is designed to include liquid passageways, the stack is assembled with appropriate passageway patterns of stop-weld material interposed between selected sheets, and, after the bonding operation, liquid passageways corresponding thereto are formed by hydraulic expansion preferably after the honeycomb passageways have been formed. These liquid passageways preferably are made to extend transversely to the honeycomb passages; hence they follow a tortuous path as they cross the surfaces of successive rows of honeycomb passages.

The invention is illustrated in the accompanying drawings wherein.

FIGS. 1–5

Figure 1:
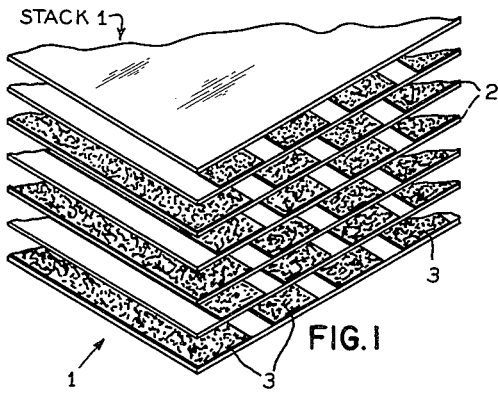
FIG. 1 is a fragmentary view, in exploded perspective, of a stack of honeycomb panel sheets prior to being welded.

In accordance with the invention, the stack-forming assembly 1 of FIG. 1 is composed of a plurality of superposed metal sheets 2 with an appropriate pattern of stop-weld strips 3 sandwiched between successive sheets. The stop-weld strips may be composed of any suitable material, such as those conventionally employed in the art of making pressure welded passageway panels. Each pattern comprises a plurality of spaced, parallel stop-weld strips 3. The width of the spacing between strips preferably is less than the width of the strips 3 but this isn't essential. The strips of the alternate patterns 3 are aligned with each other and offset transversely from the strips of the intermediate patterns 3 which likewise are aligned with each other. The strips 3 may be provided in any suitable way. Usually they are printed or screened on one face of each appropriate sheet 2 as illustrated in FIG. 1.

The assembled sheets 2 of the stack 1 are then welded together outside of the stop-weld areas by applying a suitable amount of heat and pressure. This operation, which bonds the stack into an integral panel 4, may be performed in any suitable apparatus such as that schematically indicated in FIG. 2, which comprises a fixed heated die 6 and a movable heated ram 7.

Figure 3:
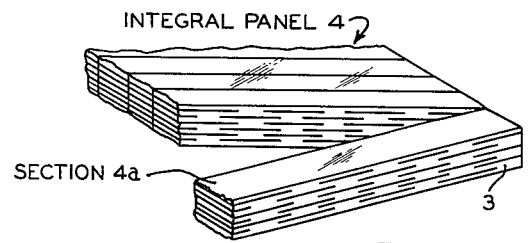
FIG. 3 is a perspective view of an integral welded panel, which has been transversely cut to provide a panel section.

The panel 4 (FIG. 3) is then severed along lines extending transversely across the stop-weld strips 3 to provide integral sections 4a having a "vertical" dimension or "thickness" equal to the thickness of the panel, a length equal to the length or width of the panel and a depth dimensioned to correspond with the thickness desired in the finished honeycomb.

Figure 4:
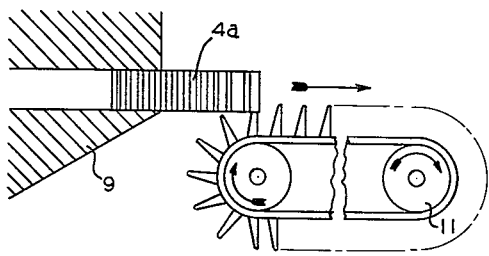
FIG. 4 is a schematic elevational view of a panel section in the process of being expanded to form a honeycomb.
Figure 5:
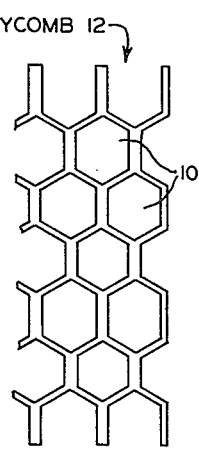
FIG. 5 is a fragmentary view of one face of an expanded honeycomb.
Figure 6:
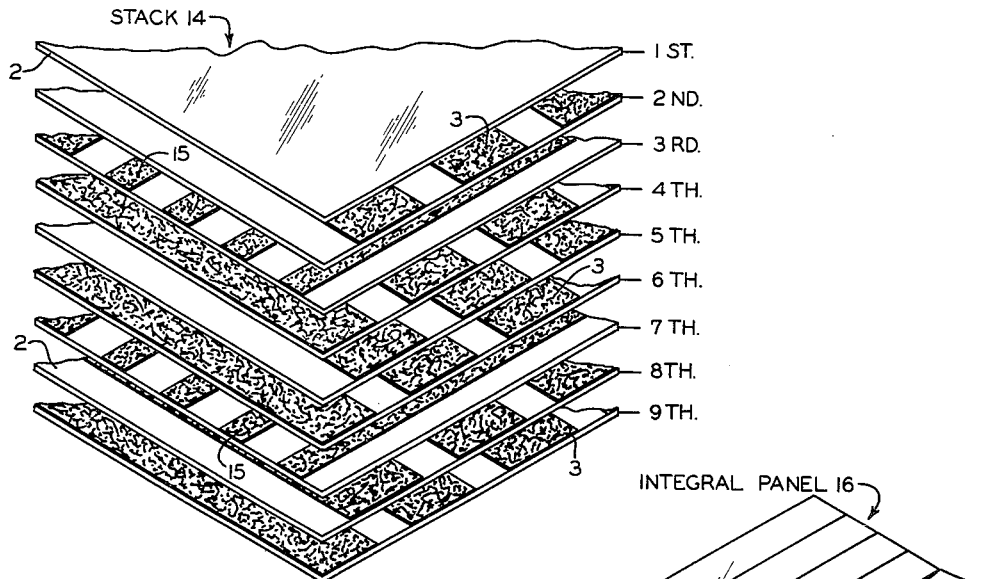
FIG. 6 is a fragmentary view, in exploded perspective, of a stack of heat exchanger honeycomb panel sheets prior to being welded.

A section 4a is next clamped between the opposing jaws of a vise 9 (FIG. 4) and its unwelded portions, which enclose the stop-weld strips 3 are progressively expanded or separated into honeycomb passages 10 by suitable means such as the tool 11 shown in FIG. 4. The tool 11 comprises: a moving endless belt mounted between spaced pulleys; and a succession of spaced rows of teeth mounted on the belt, the teeth of each row corresponding in number and relative position to the number and relative positions of the completed honeycomb passages 10 in each row. As the belt of the tool 11 moves around the left hand pulley, upward and to the right, the teeth progressively enter corresponding unwelded areas 10 and expand or pull the section 4a into a completed honeycomb 12 having individual honeycomb passages 10 as seen in FIG. 5.

A large metal honeycomb can be produced by joining together a plurality of separately made and expanded honeycombs 12 with conventional fastening means such as riveting, welding, or bolting. Also, it will be understood that a very light guage of metal is normally used in making metal honeycombs, particularly when they are intended for structural reenforcing use as the core of a metal panel.

FIGS. 6–10

A modified method is illustrated in FIGS. 6 to 10 for making a honeycomb transversely arranged liquid passageway for heat transfer purposes. Here again the stack-forming assembly 14 (FIG. 6) is composed of a plurality of metal (preferably aluminum) sheets 2 (nine shown) with an appropriate honeycomb pattern of stop-weld strips 3 conventionally sandwiched between desired sheets of the stack. In the arrangement illustrated, the strips 3 are printed on each top face of the second, fourth to sixth and eighth and ninth sheets, but omitted from the top face of the third sheet from both top and bottom of the stack.

The honeycomb patterns formed by strips 3 are identical to the patterns of FIG. 1; hence, comprise spaced parallel strips 3 of stop-weld material extending parallel to each other with the strips on the second, fifth and eighth sheets being aligned vertically with each other but offset transversely from the strips on the fourth, sixth and ninth sheets, which are vertically aligned with each other.

The top face of the third and seventh sheets 2 of the stack 14 are printed with a stop-weld pattern of liquid passageway strips 15. The strips 15 of each passageway pattern extend parallel to each other and at right angles to the strips 3 of the honeycomb patterns. Preferably each strip 15 of one pattern is vertically aligned with one strip 15 of each other passageway pattern.

Figure 2:
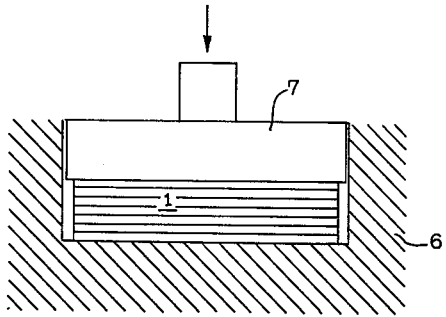
FIG. 2 is a schematic elevational view of a stack of sheets being pressure welded.

The contacting faces of the sheets 2 of stack 14 are pressure welded together throughout their bare surface areas, or, in other words, throughout all surface areas which are not separated by stop-weld material. This may be done in a suitable apparatus such as shown in FIG. 2. Where the liquid passageways ultimately formed along strips 15 must withstand substantial internal pressure, it may be desirable to pressure weld each sheet 2, which contains the liquid passageway pattern of strips 15, and the adjacent sheet, which covers that pattern, into a composite sheet before assembling the stack 14. This could be done by superposing a pair of foreshortened sheets with an interposed foreshortened pattern of strips and pressure welding them together in accordance with the method disclosed in the U.S. Patent, No. 2,662,273, to Long. The foreshortened sheets are not only integrally welded together but they normally are elongated from 4 to 5 times and correspondingly reduced in thickness.

Figure 7:
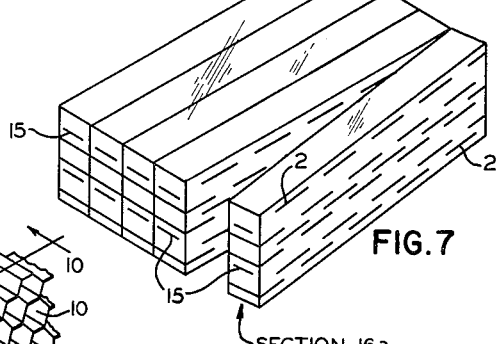
FIG. 7 is a perspective view of an integral welded panel, which has been transversely cut to provide a panel section.
Figure 9:
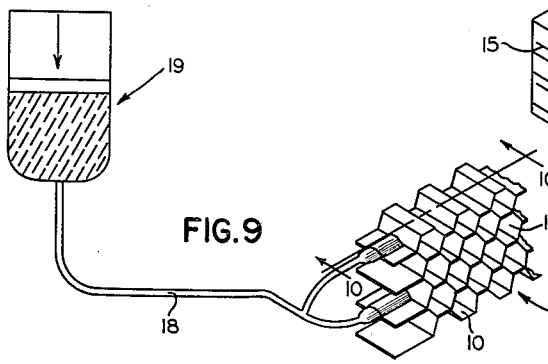
FIG. 9 is a schematic perspective of a honeycomb heat exchanger connected to the apparatus for expanding its liquid passageways.
Figure 8:
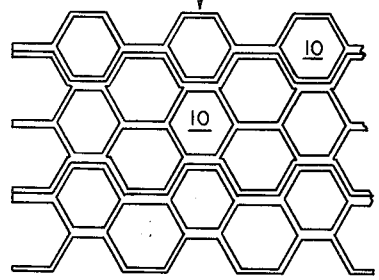
FIG. 8 is a fragmentary view of one face of a heat exchanger honeycomb after the honeycomb passages have been expanded but before the expansion of the liquid passageways.

The integral panel 16 formed, when the stack is welded, is illustrated in FIG. 7. It has a plurality of unwelded potential honeycomb-forming areas 2 corresponding to the strips 2 and a plurality of unwelded potential liquid-passageway-forming areas 15 corresponding to the strips 15.

The panel 16 may now be processed in the same manner as panel 4. This involves: severing it into a plurality of sections 16a by vertical cuts extending parallel to and centrally between adjacent liquid passageway areas 15; and then expanding each section by successively opening each row of unbonded honeycomb areas 2 with a suitable apparatus such as shown in FIG. 4, to form the openings 10 which characterize the honeycomb 17 shown in FIGS. 8 and 9.

After the completion of the expansion of the honeycomb passages 10, the potential liquid-passageway-forming areas 15 are then connected through conduit 18 to a source of hydraulic pressure 19 and hydraulically expanded by the introduction of liquid under pressure to form a heat exchanger 20 having a pair of liquid passageways 21. During expansion the opposite end of the potential passages 21 may be plugged or held closed by suitable means.

Figure 10:
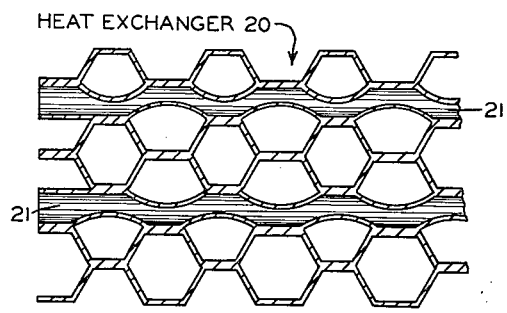
FIG. 10 is a section taken on lines 10—10 of FIG. 9.

In the completed honeycomb heat exchanger 20, shown in FIG. 10, the liquid passageways 21 extend in a tortuous path at right angles to and between adjacent honeycomb passages 10 which are themselves modified in shape by the hydraulic expansion of the passageways 21. When desired, two or more honeycomb heat exchangers 20 may be joined together along edges, corresponding to the upper and lower edges seen in FIG. 10, to provide a larger heat exchanger of desired size. This type of heat exchanger is particularly suited for use as an automobile radiator.

Having described my invention, I claim:

1. A method of making a honeycomb panel comprising: assembling a stack of superposed metal sheets together with an appropriate pattern of stop-weld material sandwiched between certain sheets, each pattern being composed of a transverse row of spaced parallel longitudinally extending strips of stop-weld material, the alternate patterns being aligned with one another and offset transversely from the intermediate patterns which are aligned with each other; applying heat and pressure to the stack to bond the sheets together outside of said stop-weld strips and thereby form an integral panel having a plurality of transverse rows of strip-like areas providing unwelded potential honeycomb passages; and expanding said honeycomb passages by inserting a plurality of expansion tools aligned in a row simultaneously into the ends of a given row of passages, each of said tools being inserted axially into its passage, and relatively moving said row of tools as a group in a direction at right angles to said row of passages and away from the unexpanded portion of said panel so as to effect the simultaneous expansion of said given row of passages and by successively repeating said insertion and expansion operation for each succeeding row of passages.

2. The method of claim 1 wherein: the stack is assembled with a liquid passageway pattern of stop-weld material interposed between certain other sheets to extend transversely across said sheets and said longitudinally extending strips of stop-weld material; and the sheets are bonded outside of said liquid passageway pattern so that said integral panel is formed with an unwelded area corresponding to said liquid passageway pattern.

3. The method of claim 2 including: expanding the unwelded portions corresponding to the liquid passageway after the honeycomb passages are expanded.

4. The method of claim 1 including: the step of cutting the unexpanded integral panel transversely across said potential honeycomb passages into several elongate sections, each section having a length corresponding to the transverse dimension of said unexpanded panel, a thickness corresponding to the thickness of said unexpanded panel and a width corresponding to the thickness desired in the final honeycomb panel formed by that section.

5. A method of making a honeycomb heat exchanger panel comprising: assembling a stack of superposed metal sheets together with an appropriate pattern of stop-weld material sandwiched between certain sheets, each pattern being composed of a plurality of spaced parallel strips of stop-weld material, extending longitudinally along said sheets with alternate patterns being aligned with one another and offset transversely from the intermediate patterns which are aligned with each other; interposing a pattern of stop-weld material between certain sheets for a liquid passageway system extending transversely across said sheets and said longitudinally extending strips of stop-weld material; pressure welding the sheets of the stack together except for areas thereof separated by said stop-weld material to form an integral panel having a plurality of strip-like areas providing unwelded longitudinally extending potential honeycomb passageways between said certain sheets and a transversely extending potential liquid passageway system between said certain other sheets; mechanically expanding said potential honeycomb passageways; and thereafter hydraulically expanding said potential liquid passageway system by introducing fluid pressure into it.

References Cited in the file of this patent

UNITED STATES PATENTS

| | | |
|---|---|---|
| 1,723,659 | Rosenquist | Aug. 6, 1929 |
| 1,751,725 | Cross | Mar. 25, 1930 |
| 2,212,481 | Sendzimir | Aug. 20, 1940 |
| 2,608,502 | Merriman | Aug. 26, 1952 |
| 2,662,273 | Long | Dec. 15, 1953 |
| 2,690,002 | Grenell | Sept. 28, 1954 |
| 2,740,188 | Simmons | Apr. 3, 1956 |
| 2,766,514 | Adams | Oct. 16, 1956 |
| 2,790,207 | Steele | Apr. 30, 1957 |
| 2,804,284 | Otten | Aug. 27, 1957 |
| 2,845,695 | Grenell | Aug. 5, 1958 |
| 2,898,815 | Simms | Aug. 11, 1959 |